Figures 1, 2:
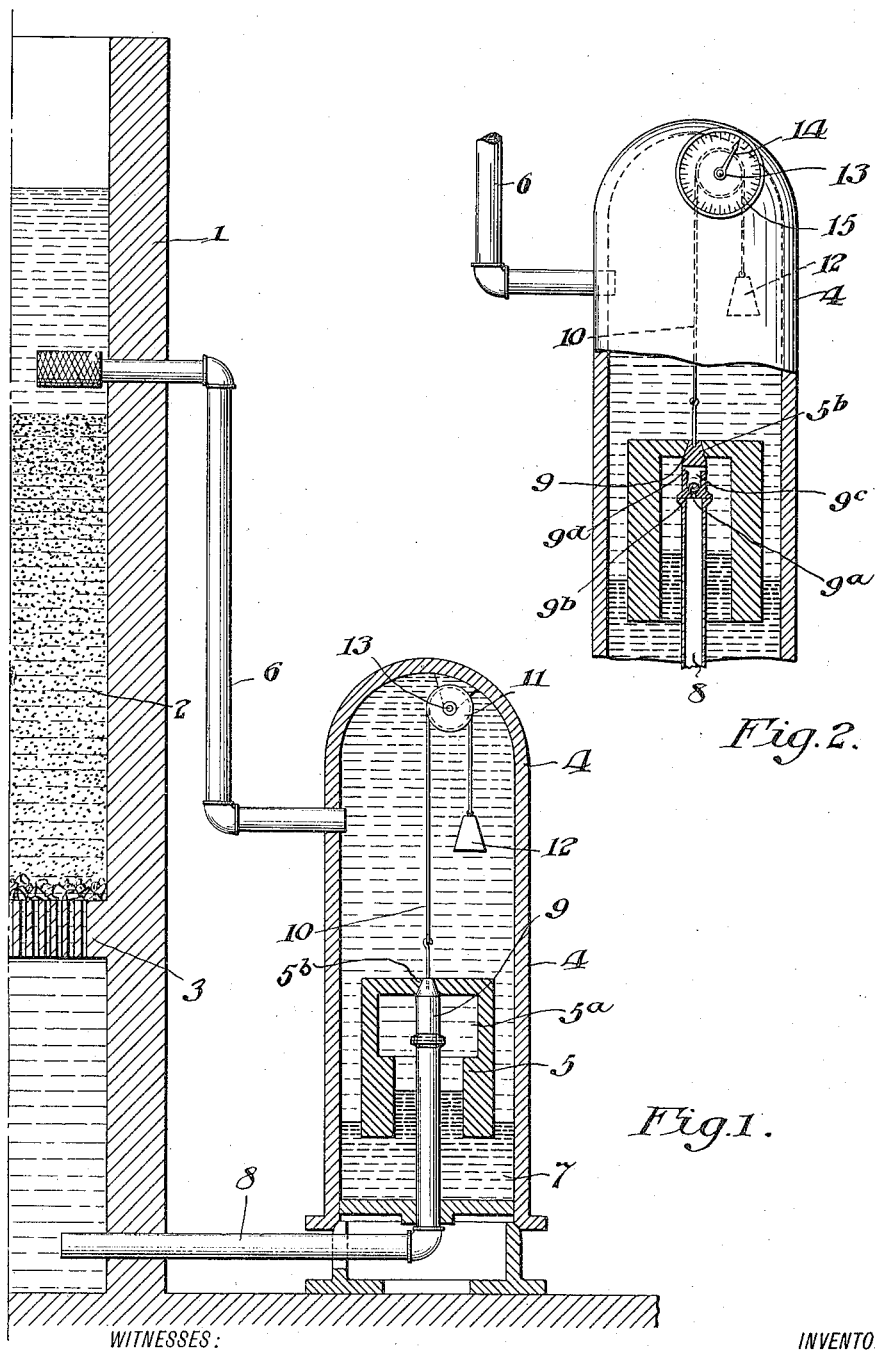

J. W. LEDOUX.
LOSS OF HEAD GAGE.
APPLICATION FILED MAY 2, 1914.

1,152,189. Patented Aug. 31, 1915.

WITNESSES:
R. Schleicher
Jos. A. Denny

INVENTOR:
John W. Ledoux,
BY
Charles N. Butler
ATTORNEY.

UNITED STATES PATENT OFFICE.

JOHN W. LEDOUX, OF SWARTHMORE, PENNSYLVANIA.

LOSS-OF-HEAD GAGE.

1,152,189.  Specification of Letters Patent.  Patented Aug. 31, 1915.

Application filed May 2, 1914. Serial No. 835,784.

*To all whom it may concern:*

Be it known that I, JOHN W. LEDOUX, a citizen of the United States, residing at Swarthmore, in the county of Delaware and State of Pennsylvania, have invented a Loss-of-Head Gage, of which the following is a specification.

This invention is designed to provide improved means for determining loss of head in filters particularly, and in its preferred form it comprises the combination, with a filter, of a casing containing an inverted hollow float sealed by a liquid heavier than that to be filtered, means for indicating the movement of the float, a conduit connecting the filter above its bed with the casing exteriorly to the float and above the heavier liquid, a conduit connecting the filter below its bed with the casing interiorly to the float and above the heavier liquid, and means for automatically closing the communication between said last named conduit and the interior of said float in the lower position of the latter (automatically neutralizing the vacuum or low pressure condition tending to prevent the rise of the float from its lowermost position with the conduit end therein closed) and releasing the air which may be trapped in the float.

In the accompanying drawings, Figure 1 is a sectional elevation of apparatus embodying my improvements; and Fig. 2 is a part sectional elevation of the upper part of the casing, a modified float and the valve mechanism.

The apparatus, as illustrated in the drawings, comprising a filter 1 containing the sand bed 2 supported by the perforated false bottom 3, in combination with a casing 4 containing an inverted hollow float 5 (having the enlarged chamber 5$^a$, as shown in Fig. 1), the conduit 6 connecting the filter above the sand bed with the interior of the casing exterior to the float and above the heavier liquid 7, the conduit 8 which connects the filter beneath the false bottom with the interior of the casing within the float and above the heavier liquid, the valve 9 which normally closes the port 5$^b$ in the top of the float and is adapted to close the conduit 8, the cord 10 which passes from a connection with the valve over a sheave 11 to a weight 12 acting through the valve to counter balance the float, the spindle 13 journaled in the top of the casing and on which the sheave 11 is fixed, the indicator 14 which is fixed on and revolved by the spindle and a dial 15 over which the indicator is movable. The valve 9 contains a passage 9$^a$ controlled by a ball-valve 9$^b$ movable in a seat 9$^c$ which communicates with the passages 9$^d$.

When the sand bed 2 is clear, so that it opposes the least resistance to percolation of liquid, as water, the difference between the pressures communicated through the conduits 6 and 8 will be at the minimum and the minimum resultant holds the float at the maximum elevation. As the filter bed gradually collects solid matter from the water, the resistance to percolation therethrough increases, the resultant or difference between the pressures communicated through the conduits increases, and the float falls proportionately in the heavier liquid, as mercury, the exterior and interior of the float's surfaces being cylindrical so that its cross sections displacing mercury are uniform. If the float falls, through abnormal causes, so that the mercury rises therein above its normal level, the greater cross sectional area of the chamber 5$^a$ prevents the mercury from overflowing into the conduit 8.

When the float has descended to a point lower than desired, valve 9 is seated on the outlet end of the conduit 8 to prevent the further descent of the float and the overflow of mercury into the conduit 8. As there is a tendency to form a restraining vacuum within the float when the valve is seated on the conduit and the resultant pressure would otherwise permit the rise of the float and valve, and as there is a reduced area to which pressure within the float is applied when the valve closes this conduit, it is desirable to relieve these conditions, and this is effected by providing communication from the conduit to the interior of the float through the passages 9$^a$, 9$^c$ and 9$^d$ controlled by the comparatively light non-return valve 9$^b$. If, as may occur, air is trapped within the float, the valve 9 can be disengaged from the port 5$^b$, to permit its escape, by turning back the shaft 13 when the float is elevated. It will be understood that the movement of the float effects a proportional movement of the hand 14 over the dial 15 to indicate the head in the filter.

Having described my invention, I claim:

1. In a loss of head gage, a casing, a hollow float in said casing, an indicating mechanism, and means comprising a valve movable relatively to said float whereby said float is connected with and operates said indicating mechanism.

2. In a loss of head gage, a casing containing a sealing liquid, a hollow float sealed by said liquid, a conduit communicating with said casing exteriorly to said float, a conduit communicating with said casing interiorly to said float, and a valve adapted to close said conduit second named and to open communication from the interior to the exterior of said float.

3. In a loss of head gage, a casing, an inverted hollow float in said casing, a conduit communicating with said casing exteriorly to said float, a conduit communicating with said casing interiorly to said float, a valve connected with said float and adapted for closing said conduit last named, and a relief valve whereby said conduit last named communicates with the interior of said float.

4. In a loss of head gage, the combination with a filter, of a casing, a hollow float in said casing, a sealing liquid in said casing, conduits for connecting said casing within and without said float with different levels of said filter separated by filtering material, and means for indicating the movement of said float.

In testimony whereof I have hereunto set my name this 22nd day of April, 1914, in the presence of the subscribing witnesses.

JOHN W. LEDOUX.

Witnesses:
Jos. G. DENNY, Jr.,
C. N. BUTLER.

Copies of this patent may be obtained for five cents each, by addressing the "Commissioner of Patents, Washington, D. C."